(12) United States Patent
Oka

(10) Patent No.: US 10,220,928 B2
(45) Date of Patent: Mar. 5, 2019

(54) SHIP, FUEL GAS SUPPLY APPARATUS, AND FUEL GAS SUPPLY METHOD

(71) Applicant: MITSUBISHI SHIPBUILDING CO., LTD., Kanagawa (JP)

(72) Inventor: Masaru Oka, Tokyo (JP)

(73) Assignee: MITSUBISHI SHIPBUILDING CO., LTD., Kanagawa (JP)

( * ) Notice: Subject to any disclaimer, the term of this patent is extended or adjusted under 35 U.S.C. 154(b) by 0 days.

(21) Appl. No.: 14/381,153

(22) PCT Filed: Mar. 26, 2013

(86) PCT No.: PCT/JP2013/058872
§ 371 (c)(1),
(2) Date: Aug. 26, 2014

(87) PCT Pub. No.: WO2013/146824
PCT Pub. Date: Oct. 3, 2013

(65) Prior Publication Data
US 2015/0040856 A1    Feb. 12, 2015

(30) Foreign Application Priority Data

Mar. 30, 2012   (JP) ................................ 2012-080335

(51) Int. Cl.
*F02B 1/12*      (2006.01)
*B63H 21/38*     (2006.01)
(Continued)

(52) U.S. Cl.
CPC ............. *B63H 21/38* (2013.01); *B63B 25/16* (2013.01); *B63H 21/14* (2013.01); *F02B 1/12* (2013.01);
(Continued)

(58) Field of Classification Search
CPC ........ F17C 2221/033; F17C 2223/0161; F17C 2223/033; F17C 2205/0332
(Continued)

(56) References Cited

U.S. PATENT DOCUMENTS 5,540,208 A * 7/1996 Kikutani ........................ 123/518
6,014,858 A * 1/2000 Zankowski ............... F01N 3/08
                                                             123/522

(Continued)

FOREIGN PATENT DOCUMENTS

CN    102656084    9/2012
JP    60-184937    9/1985
(Continued)

OTHER PUBLICATIONS

International Search Report dated Jun. 18, 2013 in International Application No. PCT/JP2013/058872.
(Continued)

*Primary Examiner* — Marguerite McMahon
*Assistant Examiner* — James Kim
(74) *Attorney, Agent, or Firm* — Wenderoth, Lind & Ponack, L.L.P.

(57) ABSTRACT

A ship includes a main pipe that guides CNG whose pressure is increased by an LNG pump to the engine; a pressure sensor that measures the pressure of CNG to be supplied to the engine; a pressure adjustment valve that adjusts the pressure of the CNG to a set pressure according to engine load; a differential pressure sensor that measures a differential pressure before and after the pressure adjustment valve; and a buffer tank that absorbs a variable pressure of the CNG in the main pipe. The discharge pressure of the LNG pump is controlled such that the differential pressure is increased when the pressure is low, and the differential pressure is decreased when the pressure is high.

9 Claims, 4 Drawing Sheets

(51) Int. Cl.
*B63B 25/16* (2006.01)
*B63H 21/14* (2006.01)
*F02M 21/02* (2006.01)
*F02B 61/00* (2006.01)
*F02D 41/00* (2006.01)
*F02B 43/10* (2006.01)

(52) U.S. Cl.
CPC .......... *F02B 61/00* (2013.01); *F02D 41/0027* (2013.01); *F02M 21/02* (2013.01); *F02M 21/0209* (2013.01); *F02M 21/0218* (2013.01); *F02M 21/0224* (2013.01); *F02M 21/0239* (2013.01); *F02B 2043/103* (2013.01); *Y02T 10/32* (2013.01); *Y02T 70/5218* (2013.01)

(58) Field of Classification Search
USPC ................ 123/27 R, 518; 62/49.1, 49.2, 613
See application file for complete search history.

(56) References Cited

U.S. PATENT DOCUMENTS

| | | | | |
|---|---|---|---|---|
| 6,039,029 | A * | 3/2000 | Nagasaka | F02B 31/087 123/336 |
| 8,820,096 | B2 * | 9/2014 | Lee et al. | 62/49.2 |
| 2002/0085921 | A1 | 7/2002 | Gram et al. | |
| 2003/0051486 | A1 | 3/2003 | Ursan et al. | |
| 2008/0276627 | A1 * | 11/2008 | Lee | F17C 9/02 62/7 |
| 2010/0043453 | A1 * | 2/2010 | Mak | F17C 5/06 62/50.2 |
| 2011/0103976 | A1 | 5/2011 | Fejzuli | |
| 2014/0238340 | A1 * | 8/2014 | Dunn | F02M 43/00 123/299 |
| 2015/0040856 | A1 * | 2/2015 | Oka | B63B 25/16 123/27 R |

FOREIGN PATENT DOCUMENTS

| | | |
|---|---|---|
| JP | 6-235352 | 8/1994 |
| JP | 2005-163723 | 6/2005 |
| JP | 2006-177618 | 7/2006 |
| JP | 2009-133352 | 6/2009 |
| JP | 2009-204026 | 9/2009 |
| JP | 2010-38012 | 2/2010 |
| JP | 2010-174748 | 8/2010 |
| JP | 2011-080361 | 4/2011 |
| KR | 10-1997-0069502 | 11/1997 |
| KR | 10-2010-0135840 | 12/2010 |
| WO | 2009/112478 | 9/2009 |

OTHER PUBLICATIONS

Written Opinion of the International Searching Authority dated Jun. 18, 2013 in International Application No. PCT/JP2013/058872.
Sai Hiramatsu et al., "Technology Trends and MHI Activities for LNG Carriers", Mitsubishi Heavy Industries Technical Review vol. 47, No. 3, 6 pages (with English translation) Sep. 2010.
Notice of Allowance dated Aug. 26, 2014 in corresponding Korean patent application No. 2014-7021678 (with English translation).
Decision to grant a European patent pursuant to Article 97(1) EPC dated Feb. 25, 2016 in European patent application No. 13767448.7.
Office Action dated Jan. 27, 2015 in corresponding Chinese patent application No. 201380011243.9.
Decision to Grant a Patent dated Jul. 27, 2015 in corresponding Chinese patent application No. 201380011243.9 (with English translation).
Extended European Search Report dated Jul. 24, 2015 in corresponding European patent application No. 13767448.7.

* cited by examiner

SHIP, FUEL GAS SUPPLY APPARATUS, AND FUEL GAS SUPPLY METHOD

TECHNICAL FIELD

The present invention relates to a ship equipped with a gas fired diesel engine, a fuel gas supply apparatus, and a fuel gas supply method.

BACKGROUND ART

Diesel engines, which inject into a cylinder high-pressure fuel gas, such as CNG (compressed natural gas) whose pressure is increased by gasifying LNG (liquefied natural gas), are known as, for example, gas fired low-speed diesel engines (SSD-GI; Slow-Speed Diesel-Gas Injection), and are regarded as being promising as main engines for propelling next-generation LNG ships and LNG/LPG fuel ships. The high-pressure fuel gas has a normal temperature (30 to 50° C.), and the pressure thereof is required to be adjusted to a range of about 150 to 250 bars (300 bars at the maximum) in accordance with the load of the diesel engines.

As the methods of producing the high-pressure fuel gas, there are generally two types. One is a liquid compression type (for example, refer to PTL 1) in which the temperature of LNG is raised to the normal temperature after the pressure of the LNG is increased by a liquid pump, and the other is a gas compression type in which the pressure of the gas after LNG has evaporated is made high by a compressor, and the high-pressure gas is cooled to the normal temperature with clean water or the like and is guided to a diesel engine.

CITATION LIST

Patent Literature

[PTL 1] Japanese Unexamined Patent Application Publication No. 2011-80361

SUMMARY OF INVENTION

Technical Problem

Although the liquid compression type is excellent in compression efficiency compared to the gas compression type, in the case of the LNG ships, a method of processing the boil-off gas from an LNG storage tank is separately required.

Meanwhile, in the gas compression type, the pressure of the boil-off gas (mixed with forcibly vaporized gas when the boil-off gas is insufficient) is increased. Thus, there is an advantage that surplus boil-off gas can be used for propulsion. However, when the boil-off gas still remains, processing methods, such as a gas incinerator and a boiler, are separately required.

In any of the above-described types, when the high-pressure fuel gas is guided to the diesel engine, the temperature and pressure of the gas should be adjusted to a temperature and a pressure required by the diesel engine. That is, the temperature of the high-pressure fuel gas should be the normal temperature, and the pressure of the high-pressure fuel gas should be increased in proportion to the output of the diesel engine.

In the case of the liquid compression type, generally, a reciprocating piston type is used as an LNG liquid pump. Thus, gas pressure pulse fluctuation (pulsation) occurs in the high-pressure fuel gas. However, it is desirable to absorb the gas pressure pulse fluctuation. This is the same not only in the case of the gas compression type and but also in a case where a gas compressor in which the gas pressure pulse fluctuation occurs as in the reciprocating piston type or the like is used.

Thus, it is considered that a buffer tank, such as a gas bottle, be provided, and the volume of a gas pipe be increased to absorb the gas pressure pulse fluctuation.

However, there is a concern that the volume of the buffer tank may decrease adjustability for required pressure when the load of the diesel engine fluctuates.

Accordingly, there is a problem in that it is difficult to make absorption of the gas pressure pulse fluctuation of the high-pressure fuel gas and high response of pressure supply to the diesel engine compatible with each other.

The invention has been made in view of such circumstances, and an object thereof is to provide a ship, a fuel gas supply apparatus, and a fuel gas supply method that can make absorption of gas pressure pulse fluctuation of high-pressure fuel gas and high response of pressure supply to a diesel engine compatible with each other.

Solution to Problem

In order to solve the above problems, the ship, the fuel gas supply apparatus, and the fuel gas supply method of the invention adopt the following means.

The ship of the invention includes a gas fired diesel engine; pressure-increasing means for increasing the pressure of fuel gas to be supplied to the gas fired diesel engine; a pressure-increasing means control unit that controls the discharge pressure of the pressure-increasing means; a main pipe that guides the fuel gas whose pressure is increased by the pressure-increasing means to the gas fired diesel engine; pressure measurement means that is provided in the main pipe for measuring the pressure of the fuel gas to be supplied to the gas fired diesel engine; and a pressure adjustment valve that is provided on the upstream side of the pressure measurement means in the main pipe to adjust the pressure of the fuel gas whose pressure is increased by the pressure-increasing means to a set pressure according to the load of the gas fired diesel engine; differential pressure measurement means for measuring a differential pressure before and after the pressure adjustment valve; a branch pipe that branches from the main pipe at an upstream position with respect to the pressure adjustment valve; and a buffer tank that is connected with the branch pipe and absorbs a variable pressure of the fuel gas in the main pipe caused by the pressure-increasing means. The pressure-increasing means control unit controls the discharge pressure of the pressure-increasing means so that the differential pressure obtained by the differential pressure measurement means is increased when the pressure obtained by the pressure measurement means or the set pressure is low and the differential pressure obtained by the differential pressure measurement means is decreased when the pressure obtained by the pressure measurement means or the set pressure is high.

The fuel gas whose pressure is increased by the pressure-increasing means is supplied to the gas fired diesel engine after the pressure is adjusted by the pressure adjustment valve. In this case, the opening degree of the pressure adjustment valve is controlled according to the load of the gas fired diesel engine. That is, the pressure adjustment valve is controlled so that the pressure of the fuel gas becomes high when the load of the gas fired diesel engine is high, and the pressure adjustment valve is controlled so that the pressure of the fuel gas becomes low when the load of the gas fired diesel engine is low.

In the ship of the invention, the discharge pressure of the pressure-increasing means is controlled by the pressure-increasing means control unit on the basis of the pressure (or the set pressure according to the load of the diesel engine) obtained by the pressure measurement means for measuring the pressure of the fuel gas to be supplied to the gas fired diesel engine, and the differential pressure obtained by the differential pressure measurement means for measuring the differential pressure before and after the pressure adjustment valve.

That is, the upstream pressure of the pressure adjustment valve can be kept high by controlling the discharge pressure of the pressure-increasing means so that the differential pressure obtained by the differential pressure measurement means is increased when the pressure obtained by the pressure measurement means is low. As a result, even if the gas fired diesel engine has low load and has low pressure, it is possible to cope with a sudden load rise, that is, a sudden pressure rise. Particularly, when the buffer tank that absorbs the variable pressure of the fuel gas in the main pipe is provided as in the invention, this is effective because there is no concern that the volume of the buffer tank may make the pressure response slow.

Additionally, the required sufficient upstream pressure of the pressure adjustment valve corresponding to the high load of the gas fired diesel engine can be ensured by controlling the discharge pressure of the pressure-increasing means so that the differential pressure obtained by the differential pressure measurement means is decreased when the pressure (or the set pressure according to the load of the diesel engine) obtained by the pressure measurement means is high. As a result, it is possible to avoid a situation in which the upstream pressure of the pressure adjustment valve becomes excessively high.

In addition, the "fuel gas" typically includes CNG obtained by vaporizing and compressing LNG.

Additionally, the "pressure-increasing means" typically includes, for example, a liquid pump that increases the pressure of LNG that is a liquid, and a gas compressor that compresses vaporized NG (natural gas). When the liquid pump and the gas compressor are of a reciprocating piston type, variable pressure (pulsation) is apt to occur in the fuel gas. Thus, the invention including the buffer tank is particularly effective.

Additionally, as the "differential pressure measurement means", a differential pressure sensor that measures the differential pressure before and after the pressure adjustment valve may be provided, or a pressure sensor may be provided on the upstream side of the pressure adjustment valve and a differential pressure from that of the pressure measurement means provided on the downstream side of the pressure adjustment valve may be used.

The fuel gas supply apparatus of the invention includes a pressure-increasing means control unit that controls the discharge pressure of a pressure-increasing means that increases the pressure of fuel gas to be supplied to a gas fired diesel engine; a main pipe that guides the fuel gas whose pressure is increased by the pressure-increasing means to the gas fired diesel engine; pressure measurement means that is provided in the main pipe for measuring the pressure of the fuel gas to be supplied to the gas fired diesel engine; a pressure adjustment valve that is provided on the upstream side of the pressure measurement means in the main pipe to adjust the pressure of the fuel gas whose pressure is increased by the pressure-increasing means to a set pressure according to the load of the gas fired diesel engine; differential pressure measurement means for measuring a differential pressure before and after the pressure adjustment valve; a branch pipe that branches from the main pipe at an upstream position with respect to the pressure adjustment valve; and a buffer tank that is connected with the branch pipe and absorbs a variable pressure of the fuel gas in the main pipe caused by the pressure-increasing means. The pressure-increasing means control unit controls the discharge pressure of the pressure-increasing means so that the differential pressure obtained by the differential pressure measurement means is increased when the pressure obtained by the pressure measurement means or the set pressure is low and the differential pressure obtained by the differential pressure measurement means is decreased when the pressure obtained by the pressure measurement means or the set pressure is high.

The fuel gas whose pressure is increased by the pressure-increasing means is supplied to the gas fired diesel engine after the pressure is adjusted by the pressure adjustment valve. In this case, the opening degree of the pressure adjustment valve is controlled according to the load of the gas fired diesel engine. That is, the pressure adjustment valve is controlled so that the pressure of the fuel gas becomes high when the load of the gas fired diesel engine is high, and the pressure adjustment valve is controlled so that the pressure of the fuel gas becomes low when the load of the gas fired diesel engine is low.

In the fuel gas supply apparatus of the invention, the discharge pressure of the pressure-increasing means is controlled by the pressure-increasing means control unit on the basis of the pressure (or the set pressure according to the load of the diesel engine) obtained by the pressure measurement means for measuring the pressure of the fuel gas to be supplied to the gas fired diesel engine, and the differential pressure obtained by the differential pressure measurement means for measuring the differential pressure before and after the pressure adjustment valve.

That is, the upstream pressure of the pressure adjustment valve can be kept high by controlling the discharge pressure of the pressure-increasing means so that the differential pressure obtained by the differential pressure measurement means is increased when the pressure obtained by the pressure measurement means is low. As a result, even if the gas fired diesel engine has low load and has low pressure, it is possible to cope with a sudden load rise, that is, a sudden pressure rise. Particularly, when the buffer tank that absorbs the variable pressure of the fuel gas in the main pipe is provided as in the invention, this is effective because there is no concern that the volume of the buffer tank may make the pressure response slow.

Additionally, the required sufficient upstream pressure of the pressure adjustment valve corresponding to the high load of the gas fired diesel engine can be ensured by controlling the discharge pressure of the pressure-increasing means so that the differential pressure obtained by the differential pressure measurement means is decreased when the pressure (or the set pressure according to the load of the diesel engine) obtained by the pressure measurement means is high. As a result, it is possible to avoid a situation in which the upstream pressure of the pressure adjustment valve becomes excessively high.

A differential pressure control valve may be provided on the upstream side of the buffer tank of the branch pipe, and the differential pressure control valve may be controlled in an opening direction when a differential pressure between a first pressure at a position of the branch pipe on the side of the main pipe and a second pressure at a position closer to the buffer tank side than the position on the side of the main pipe is small, and may be controlled in a closing direction when the differential pressure large.

When the differential pressure between the first pressure at the position of the branch pipe on the side of the main pipe and the second pressure at the position closer to the buffer tank side than the position on the side of the main pipe is small, the differential pressure control valve is controlled in the opening direction to permit the flow of the fuel gas within the branch pipe and absorb the variable pressure caused by the buffer tank. On the other hand, when the differential pressure of the first pressure and the second pressure is large, the differential pressure control valve is controlled in the closing direction, so that the flow of the fuel gas within the branch pipe that leads to the buffer tank can be limited, and the pressure response of the fuel gas within the main pipe can be enhanced.

Additionally, a rate of decline in the pressure within the buffer tank can be made small by controlling the differential pressure using the differential pressure control valve in this way. As a result, excessive cooling of the buffer tank or the branch pipe by Joule-Thompson expansion can be avoided.

In addition, even when the differential pressure control valve is controlled in the closing direction, it is preferable not to leave minutely open but to fully close the differential pressure control valve.

Moreover, it is preferable that the first pressure and the second pressure be pressures at positions before and after the differential pressure control valve.

Alternatively, it is preferable that the branch pipe be provided with an orifice, and the first pressure and the second pressure be pressures at positions before and after the orifice. In this case, the orifice may be located on the upstream side or the downstream side of the differential pressure control valve.

Moreover, in the fuel gas supply apparatus, an auxiliary fuel gas supply pipe that supplies the fuel gas to the buffer tank may be provided from the downstream side of the pressure adjustment valve in the main pipe, and the auxiliary fuel gas supply pipe may be provided with a check valve that permits the flow of the fuel gas from the main pipe toward the buffer tank at a predetermined differential pressure or higher.

When the pressure within the buffer tank has dropped due to a certain cause, if the pressure within the buffer tank drops and the differential pressure before and after the check valve becomes a predetermined value or higher, the check valve can be opened and the fuel gas can be supplied from the main pipe to the buffer tank by the auxiliary fuel gas supply pipe. As a result, the pressure within the buffer tank can always be kept at a predetermined value or higher.

The fuel gas supply method of the invention uses a fuel gas supply apparatus including a pressure-increasing means control unit that controls the discharge pressure of a pressure-increasing means that increases the pressure of fuel gas to be supplied to a gas fired diesel engine; a main pipe that guides the fuel gas whose pressure is increased by the pressure-increasing means to the gas fired diesel engine; pressure measurement means that is provided in the main pipe for measuring the pressure of the fuel gas to be supplied to the gas fired diesel engine; and a pressure adjustment valve that is provided on the upstream side of the pressure measurement means in the main pipe to adjust the pressure of the fuel gas whose pressure is increased by the pressure-increasing means to a set pressure according to the load of the gas fired diesel engine; differential pressure measurement means for measuring a differential pressure before and after the pressure adjustment valve; a branch pipe that branches from the main pipe at an upstream position with respect to the pressure adjustment valve; and a buffer tank that is connected with the branch pipe and absorbs a variable pressure of the fuel gas in the main pipe caused by the pressure-increasing means. The discharge pressure of the pressure-increasing means is controlled by the pressure-increasing means control unit so that the differential pressure obtained by the differential pressure measurement means is increased when the pressure obtained by the pressure measurement means or the set pressure is low and the differential pressure obtained by the differential pressure measurement means is decreased when the pressure obtained by the pressure measurement means or the set pressure is high.

Advantageous Effects of Invention

That is, the upstream pressure of the pressure adjustment valve can be kept high by controlling the discharge pressure of the pressure-increasing means so that the differential pressure obtained by the differential pressure measurement means is increased when the pressure (or the set pressure according to the load of the diesel engine) obtained by the pressure measurement means is low. As a result, even if the gas fired diesel engine has low load and has low pressure, it is possible to cope with a sudden load rise, that is, a sudden pressure rise. Particularly, when the buffer tank that absorbs the variable pressure of the fuel gas in the main pipe is provided as in the invention, this is effective because there is a concern that the volume of the buffer tank may make the pressure response slow.

Additionally, the required sufficient upstream pressure of the pressure adjustment valve corresponding to the high load of the gas fired diesel engine can be ensured by controlling the discharge pressure of the pressure-increasing means so that the differential pressure obtained by the differential pressure measurement means is decreased when the pressure (or the set pressure according to the load of the diesel engine) obtained by the pressure measurement means is high. As a result, it is possible to avoid a situation in which the upstream pressure of the pressure adjustment valve becomes excessively high.

DESCRIPTION OF EMBODIMENTS

Hereinafter, embodiments related to the invention will be described with reference to the drawings.

First Embodiment

Hereinafter, a first embodiment of the invention will be described with reference to FIGS. 1 to 4.

Figure 1:
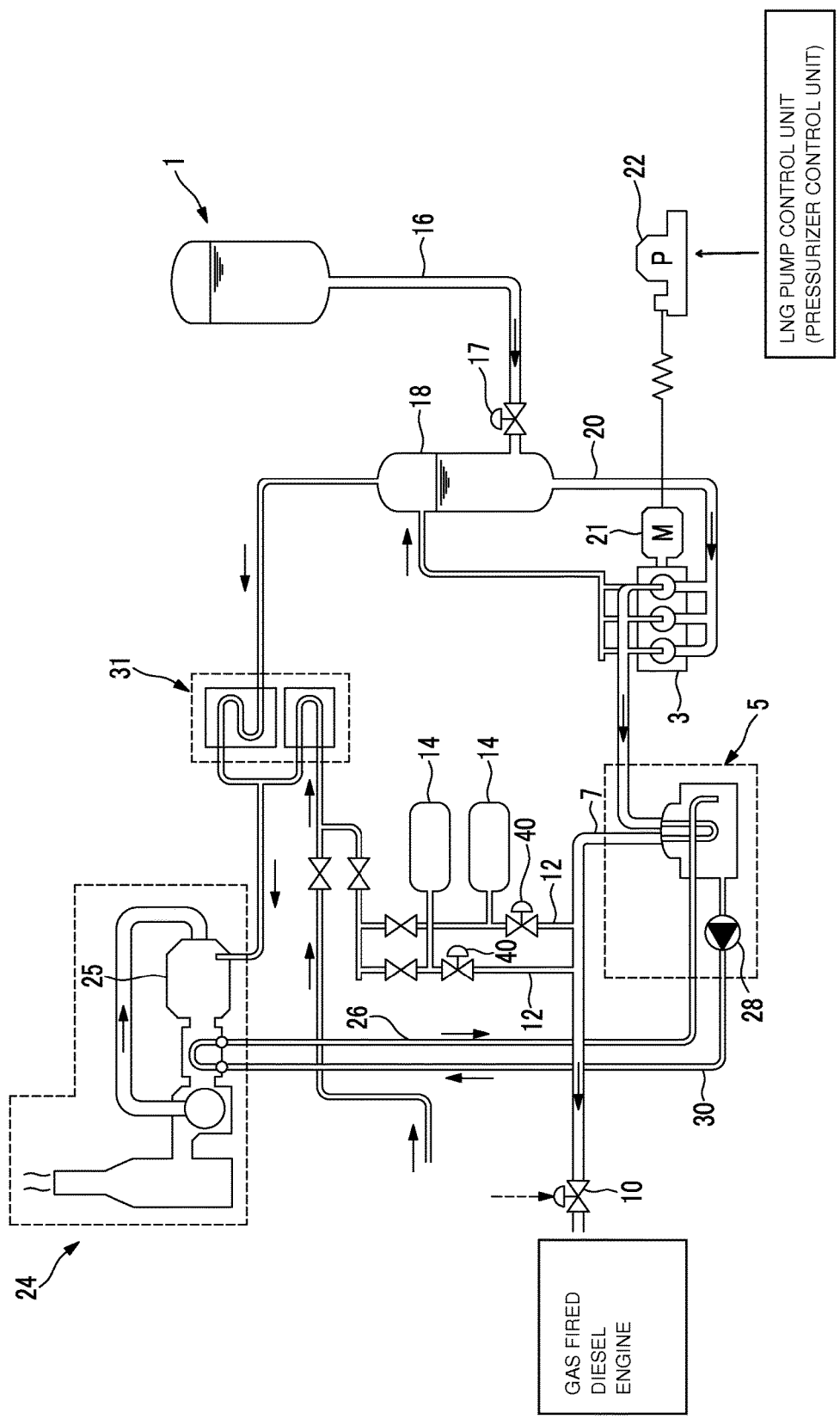
FIG. 1 is a schematic configuration diagram showing an LNG supply system that supplies fuel gas to a gas fired diesel engine of an LNG ship.

An LNG supply system, which supplies CNG (compressed natural gas), that is, fuel gas to a gas fired diesel engine (hereinafter referred to as "engine") to be used as a main engine for propelling an LNG ship (vessel), is shown in FIG. 1.

The LNG supply system includes an LNG tank 1, such as a cargo tank, which stores LNG, an LNG pump 3 that increases the pressure of the LNG guided from the LNG tank 1, a gasifying device 5 that gasifies the high-pressure LNG guided from the LNG pump 3, and a main pipe 7 that guides the CNG (compressed natural gas) gasified by the gasifying device 5 to the engine.

An LNG extraction pipe 16 is connected to a lower part of the LNG tank 1, and the LNG within the LNG tank 1 is guided to a suction drum 18 via the LNG extraction pipe 16. The LNG extraction pipe 16 is provided with a liquid level control valve 17, and the liquid level position of LNG within the suction drum 18 is controlled by the liquid level control valve 17.

An LNG supply pipe 20 is connected to a lower part of the suction drum 18, and the LNG within the suction drum 18 is guided to the LNG pump 3 via the LNG supply pipe 20. In addition, boil-off gas generated within the suction drum 18 is guided to a combustion furnace 25 of a gas combustion apparatus 24. An air heat exchanger 31 is provided between the combustion furnace 25 and the suction drum 18, and the boil-off gas is raised in temperature by the air heat exchanger 31, and is incinerated by the combustion furnace 25.

The LNG pump 3 is of a reciprocating piston type in which a piston within a cylinder is driven by a hydraulic motor 21. The hydraulic motor 21 is driven by the oil pressure supplied from an oil pressure generating unit 22. The discharge pressure, that is, rotating speed of the LNG pump 3 is controlled by an LNG pump control unit (not shown).

The high-pressure LNG whose pressure is increased by the LNG pump 3 is sent to the gasifying device 5 and is gasified. The steam heated and generated by the combustion gas of the gas combustion apparatus 24 is guided to the gasifying device 5 via a steam introduction pipe 26, and the high-pressure LNG is vaporized by the steam guided by the steam introduction pipe 26. The steam obtained by heating the high-pressure LNG is condensed and liquefied, and is returned to the gas combustion apparatus 24 via a clean water return pipe 30 as clean water by a clean water pump 28.

The CNG gasified by the gasifying device 5 is guided to the main pipe 7.

The main pipe 7 is provided with a pressure adjustment valve 10, and the gas pressure corresponding to engine load is adjusted by the pressure adjustment valve 10.

A branch pipe 12 is connected to a halfway position of the main pipe 7, that is, the upstream side of the pressure adjustment valve 10, and a gas bottle (buffer tank) 14 is connected to the branch pipe 12. A differential pressure control valve 40 to be described below is provided on the upstream side of the gas bottle 14 in the branch pipe 12. In addition, in the embodiment shown in FIG. 1, two branch pipes 12 are provided in parallel, and gas bottles 14 are connected to the branch pipes, respectively. However, the invention is not particularly limited to this configuration. One gas bottle or a plurality of gas bottles may be connected to one branch pipe, and gas bottles may be provided to three or more branch pipes, respectively.

Figure 2:
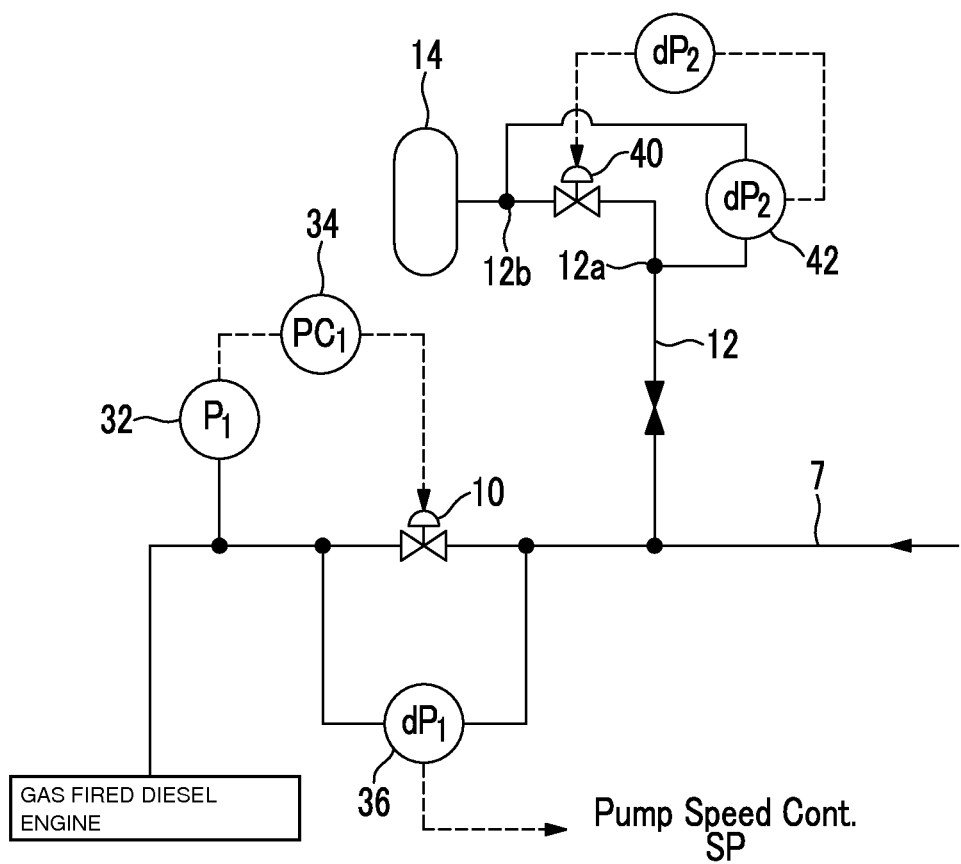
FIG. 2 is a schematic configuration diagram showing a fuel gas supply apparatus related to a first embodiment.

Next, a fuel gas supply apparatus related to the present embodiment will be described with reference to FIG. 2. The main pipe 7, the branch pipe 12, the pressure adjustment valve 10, and the gas bottle 14, which are described with reference to FIG. 1, are shown in FIG. 2.

A pressure sensor (pressure measurement means) 32 is provided at a halfway position of the main pipe 7, that is, on the downstream side of the pressure adjustment valve 10. The pressure of CNG to be supplied to the engine is measured by the pressure sensor 32. A measured pressure P1 obtained by the pressure sensor 32 is sent to a pressure sensor control unit 34. A set pressure P1set according to the engine load is saved in a storage region of the pressure sensor control unit 34, and the set pressure P1set corresponding to the load according to an instruction from an engine control unit (not shown) is calculated. In the pressure sensor control unit 34, the opening degree of the pressure adjustment valve 10 is controlled on the basis of the deviation between the calculated set pressure P1set and the measured pressure P1 from the pressure sensor 32.

The main pipe 7 is provided with a differential pressure sensor (differential pressure measurement means) 36 that measures a differential pressure before and after the pressure adjustment valve 10. A measured differential pressure dP1 obtained by the differential pressure sensor is used when the rotating speed, that is, discharge pressure of the LNG pump 3 (refer to FIG. 1) is determined. In addition, instead of the differential pressure sensor 36, a second pressure sensor may be provided on the upstream side of the pressure adjustment valve 10 so as to obtain a differential pressure using a difference from the measured pressure P1 of the pressure sensor 32.

Figure 3:
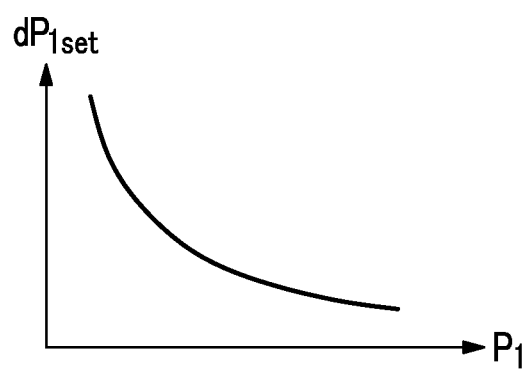
FIG. 3 is the graph showing the relationship between set differential pressure and measured pressure to be used when the rotating speed of an LNG pump is determined.

The relationship between the set differential pressure dP1set and the measured pressure P1 to be used when the rotating speed of the LNG pump 3 is determined by the LNG pump control unit is shown in FIG. 3. As shown in this drawing, there is a relationship in which the set differential pressure dP1set is increased when the measured pressure P1 is low and the set differential pressure dP1set is decreased when the measured pressure P1 is high. Since the measured pressure P1 is proportional to the engine load, a case where the measured pressure P1 is low shows a case where the engine load is small and a case where the measured pressure P1 is high shows a case where the engine load is large. Accordingly, as shown in FIG. 3, the relationship means that the set differential pressure dP1set is set in inverse proportion to the measured pressure P1, that is, the engine load. As a result, since the measured pressure P1 is low when the engine load is small, the set differential pressure dP1set is set to be large, and the upstream pressure of the pressure adjustment valve 10 is kept high.

On the other hand, since the measured pressure P1 is high when the engine load is large, the set differential pressure dP1set is set to be small, and the required sufficient upstream pressure of the pressure adjustment valve 10 corresponding to the high load of the engine is ensured.

In addition, in FIG. 3, the set differential pressure dP1set is determined on the basis of the measured pressure P1. However, instead of the measured pressure P1, the set differential pressure dP1set may be determine on the basis of the above-described set pressure P1set that is set according to the engine load.

As shown in FIG. 2, the branch pipe 12 is provided with the differential pressure control valve 40. The opening degree of the differential pressure control valve is controlled according to the measured differential pressure dP2 of a branch pipe differential pressure sensor 42. The branch pipe differential pressure sensor 42 measures a differential pressure before and after the differential pressure control valve 40, and specifically, measures a differential pressure between a first pressure at a position 12a of the differential pressure control valve 40 on the side of the main pipe and a second pressure at a position 12b of the differential pressure control valve 40 on the side of the gas bottle 14.

Figure 4:
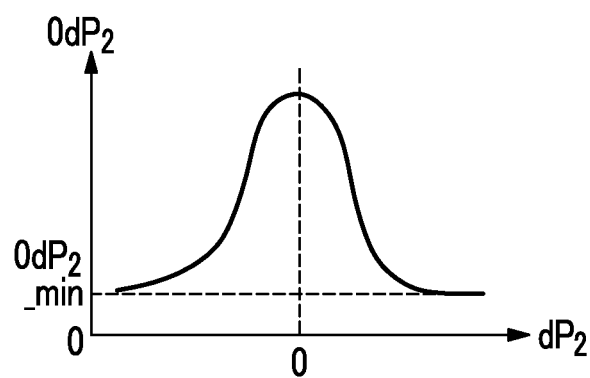
FIG. 4 is a graph showing the relationship between the opening degree of a differential pressure control valve, and the measured differential pressure.

The relationship between an opening degree indicating value OdP2 of the differential pressure control valve 40 and the measured differential pressure dP2 is shown in FIG. 4. In this drawing, the horizontal axis shows the measured differential pressure dP2, and the vertical axis shows the opening degree indicating value OdP2. As shown in this drawing, the relationship is determined to have a shape resembling a substantially normal distribution so that the opening degree reaches the maximum when the measured differential pressure dP2 is 0 (zero) and the opening degree indicating value OdP2 decreases as the deviation of the measured differential pressure dP2 from 0 (zero) increases. A minimum opening degree OdP2_min is not set to 0 (zero) but set to a small opening degree so as to maintain a predetermined opening degree.

Next, the effects of the fuel gas supply apparatus having the above-described configuration will be described.

When the engine load is small, the opening degree of the pressure adjustment valve 10 is controlled on the basis of the measured pressure P1 of the pressure sensor so that the downstream pressure of the pressure adjustment valve 10 becomes low according to an instruction from the engine control unit. In this case, since the measured pressure P1 is low as shown in FIG. 3, the set differential pressure dP1set is set to a large value. In the LNG pump control unit, the rotating speed of the LNG pump 3 is increased and decreased, referring to the measured differential pressure of the differential pressure sensor 36 so as to satisfy the set differential pressure dP1set that is set to be large. The gas pressure pulse fluctuation (pulsation) transmitted from the LNG pump 3 caused in this case are absorbed by the gas bottle connected via the branch pipe 12 to the main pipe 7. That is, the pulsation is absorbed by the volume of the gas bottle 14. In this case, since the flow rate fluctuation of a CNG flow within the branch pipe 12 caused by the pulsation is relatively small, the flow rate fluctuation is not measured as a large differential pressure by the branch pipe differential pressure sensor 42, but as shown in FIG. 4, the opening degree indicating value OdP2 of the differential pressure control valve 40 is set to a large value, the flow of CNG that flows into and flows out of the gas bottle 14 is allowed, and the pulsation absorption is not hindered.

Then, if the engine load rises suddenly from a low load to a high load, the opening degree of the pressure adjustment valve 10 is controlled in an opening direction at high speed so as to suddenly increase the downstream pressure of the pressure adjustment valve 10. In this case, since the upstream pressure of the pressure adjustment valve 10 is set to be high as described above, it is possible to cope with a requirement for a sudden pressure rise with high responsiveness.

On the other hand, since the measured pressure P1 is high as shown in FIG. 3 when the engine load is large, the set differential pressure dP1set is set to be small. As a result, a situation in which the upstream pressure of the pressure adjustment valve 10 becomes excessively high can be avoided by ensuring a required sufficient upstream pressure of the pressure adjustment valve 10 corresponding to the high load of the engine.

Additionally, when the pressure within the main pipe 7 fluctuates sharply due to a sudden rise and sudden fall of the engine load, the flow rate fluctuation of the CNG flow within the branch pipe 12 become large, and a large differential pressure is measured by the branch pipe differential pressure sensor 42. Then, as shown in FIG. 4, the opening degree of the differential pressure control valve 40 is controlled in a closing direction, and a fuel gas flow within the branch pipe 12 that leads to the gas bottle 14 is limited. As a result, the pressure response within the main pipe 7 is prevented from becoming slow by the volume of the gas bottle 14. Moreover, since the sudden fall of the pressure within the gas bottle 14 is hindered, excessive cooling of the gas bottle 14 and eventually the branch pipe 12 by Joule-Thompson expansion can be avoided.

In addition, even when the opening degree of the differential pressure control valve 40 is controlled in the closing direction, the control valve is not fully closed but is left minutely open at a predetermined minimum opening degree OdP2 min. As a result, even when the measured differential pressure dP2 is large, it is possible to perform a certain degree of pulsation absorption.

As described above, according to the present embodiment, it is possible to make the absorption of gas pressure pulse fluctuation of CNG and the high response of pressure supply to the engine compatible with each other.

Second Embodiment

Figure 5:
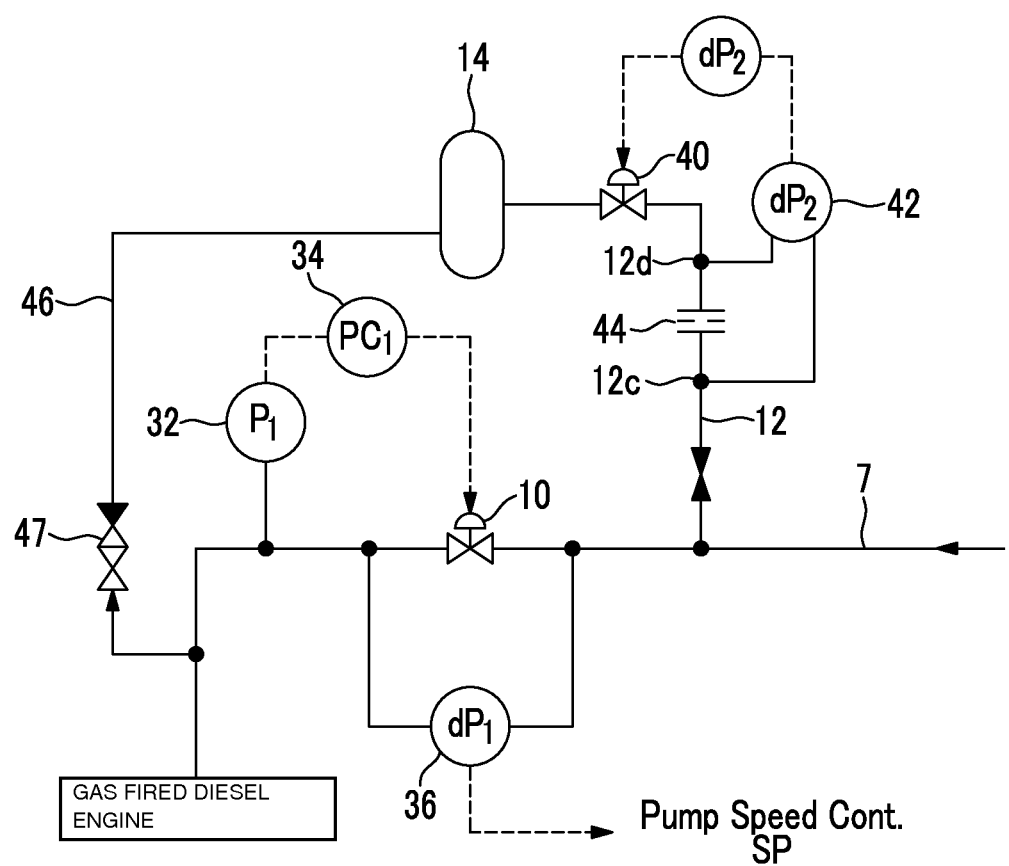
FIG. 5 is a schematic configuration diagram showing a fuel gas supply apparatus related to a second embodiment.

Next, a second embodiment of the invention will be described with reference to FIG. 5.

In the present embodiment, the same components as those of the first embodiment will be designated by the same reference numerals and the description thereof will be omitted.

The present embodiment is different from the first embodiment in terms of differential pressure measurement in the branch pipe 12. In the first embodiment, the branch pipe differential pressure sensor is provided so as to measure the differential pressure before and after the differential pressure control valve 40 (refer to FIG. 2). However, in the present embodiment, an orifice 44 that is a fixed aperture is provided in the branch pipe 12, and the differential pressure before and after the orifice 44 is measured by the branch pipe differential pressure sensor 42. In the present embodiment, the branch pipe differential pressure sensor 42 measures a differential pressure between a first pressure of the orifice 44 at a position 12c on the side of the main pipe and a second pressure at a position 12d of the orifice 44 on the side of the gas bottle 14. Since the control using the differential pressure measured by the branch pipe differential pressure sensor 42 is the same as that of the first embodiment, the description thereof will be omitted. In addition, in the embodiment shown in FIG. 5, the orifice 44 is provided on the upstream side of the differential pressure control valve 40. However, the orifice may be provided on the downstream side of the differential pressure control valve 40.

Additionally, the present embodiment is different from the first embodiment in that an auxiliary CNG supply pipe (auxiliary fuel gas supply pipe) 46 that supplies CNG to the gas bottle 14 is provided from the downstream side of the pressure adjustment valve 10 in the main pipe 7. The auxiliary CNG supply pipe 46 is provided with a check valve 47 that permits the flow of CNG from the main pipe 7 to the gas bottle 14 at a predetermined differential pressure or higher. On the other hand, at lower than the predetermined differential pressure, the check valve 47 is fully closed, and CNG does not flow through the auxiliary CNG supply pipe 46.

In this way, even when the pressure within the gas bottle 14 has dropped due to a certain cause, if the pressure within the gas bottle 14 drops and the differential pressure before and after the check valve 47 becomes a predetermined value or higher, the check valve can be opened and CNG can be supplied from the main pipe 7 to the gas bottle 14 by the auxiliary CNG supply pipe 46. As a result, the pressure within the gas bottle 14 can always be kept at a predetermined value or higher.

In addition, it is natural that the auxiliary CNG supply pipe 46 of the present embodiment may be provided to the first embodiment.

In addition, although the liquid compression type in which the pressure of LNG is increased using the LNG pump 3 that is a liquid pump has been described in the above-described respective embodiments, the invention can also be applied to a gas compression type using a gas compressor that compresses NG after LNG is vaporized.

REFERENCE SIGNS LIST

1: LNG TANK
3: LNG PUMP (PRESSURE-INCREASING MEANS)
5: GASIFYING DEVICE
7: MAIN PIPE
10: PRESSURE ADJUSTMENT VALVE
12: BRANCH PIPE
14: GAS BOTTLE (BUFFER TANK)
16: LNG EXTRACTION PIPE
18: SUCTION DRUM
20: LNG SUPPLY PIPE
22: OIL PRESSURE GENERATING UNIT
24: GAS COMBUSTION APPARATUS
25: COMBUSTION FURNACE
26: STEAM INTRODUCTION PIPE
28: CLEAN WATER PUMP
30: CLEAN WATER RETURN PIPE
32: PRESSURE SENSOR (PRESSURE MEASUREMENT MEANS)
34: PRESSURE SENSOR CONTROL UNIT
36: DIFFERENTIAL PRESSURE SENSOR (DIFFERENTIAL PRESSURE MEASUREMENT MEANS)
40: DIFFERENTIAL PRESSURE CONTROL VALVE
42: BRANCH PIPE DIFFERENTIAL PRESSURE SENSOR
44: ORIFICE
46: AUXILIARY CNG SUPPLY PIPE (AUXILIARY FUEL GAS SUPPLY PIPE)
47: CHECK VALVE

The invention claimed is:

1. A ship comprising:
a gas fired diesel engine;
a pressurizer configured to increase pressure of fuel gas;
a main pipe that guides the fuel gas whose pressure is increased by the pressurizer to the gas fired diesel engine;
a pressure measurement device provided in the main pipe and configured to measure the pressure of the fuel gas as a measured pressure; and
a pressure adjustment valve provided on an upstream side of the pressure measurement device in the main pipe and configured to adjust the pressure of the fuel gas;
a differential pressure measurement device configured to measure a differential pressure between an upstream side and a downstream side of the pressure adjustment valve as a measured differential pressure;
a branch pipe that branches from the main pipe at an upstream position with respect to the pressure adjustment valve;
a buffer tank that is connected with the branch pipe and absorbs a pressure of the fuel gas in the main pipe caused by the pressurizer;
a first control unit configured to calculate a set pressure according to a load of the gas fired diesel engine and to control an opening degree of the pressure adjustment valve by using the calculated set pressure; and
a second control unit configured to:
receive information showing a predetermined relationship between a set differential pressure and the measured pressure measured by the pressure measurement device or the set pressure calculated by the first control unit, the predetermined relationship being that an increase and decrease of the set differential pressure is inversely proportional to an increase and decrease of the measured pressure or an increase and decrease of the set pressure;
determine the set differential pressure corresponding to the measured pressure or the set pressure by using the information; and
control the pressurizer so that the measured differential pressure measured by the differential pressure measurement device matches the set differential pressure determined by using the information,
wherein the information is used by the second control unit to adjust pressure conditions of the fuel gas on downstream side of the pressure adjustment valve based on the change of the load of the gas fired diesel engine,
a differential pressure control valve is provided on an upstream side of the buffer tank of the branch pipe,
an opening degree of the differential pressure control valve is controlled to be at a maximum value when a differential pressure between a first pressure at a position of the branch pipe on a side of the main pipe and a second pressure at a position closer to a buffer tank side than the position on the side of the main pipe is zero, and is controlled to decrease in opening degree from the maximum value as the differential pressure increases, and
the opening degree of the differential pressure control valve is controlled to a minimum value when the differential pressure increases to a maximum value, the minimum value of the opening degree being less than the maximum value but greater than zero so as to maintain a predetermined opening degree.

2. A fuel gas supply apparatus comprising:
a main pipe that guides fuel gas whose pressure is increased by a pressurizer to a gas fired diesel engine;
a pressure measurement device that is provided in the main pipe and configured to measure pressure of the fuel gas as a measured pressure; and
a pressure adjustment valve provided on an upstream side of the pressure measurement device in the main pipe and configured to adjust the pressure of the fuel gas;
a differential pressure measurement device configured to measure a differential pressure before and after the pressure adjustment valve as a measured differential pressure;
a branch pipe that branches from the main pipe at an upstream position with respect to the pressure adjustment valve;
a buffer tank that is connected with the branch pipe and absorbs a pressure of the fuel gas in the main pipe caused by the pressurizer;
a first control unit configured to calculate a set pressure according to a load of the gas fired diesel engine and to control an opening degree of the pressure adjustment valve by using the calculated set pressure; and a second control unit configured to:

receiving information showing a predetermined relationship between the set differential pressure and the measured pressure measured by the pressure measurement device or the set pressure calculated by the first control unit, the predetermined relationship being that an increase and decrease of the set differential pressure is inversely proportional to an increase and decrease of the measured pressure or an increase and decrease of the set pressure;

determine the set differential pressure corresponding to the measured pressure or the set pressure by using the information; and control the pressurizer so that the measured differential pressure measured by the differential pressure measurement device matches the set differential pressure determined by using the information, wherein the information is used by the second control unit to adjust pressure conditions of the fuel gas on downstream side of the pressure adjustment valve based on the change of the load of the gas fired diesel engine, a differential pressure control valve is provided on an upstream side of the buffer tank of the branch pipe, an opening degree of the differential pressure control valve is controlled to be a maximum value when a differential pressure between a first pressure at a position of the branch pipe on a side of the main pipe and a second pressure at a position closer to a buffer tank side than the position on the side of the main pipe is zero, and is controlled to decrease in opening degree from the maximum value as the differential pressure increases, and the opening degree of the differential pressure control valve is controlled to a minimum value when the differential pressure increases to a maximum value, the minimum value of the opening degree being less than the maximum value but greater than zero so as to maintain a predetermined opening degree.

3. The fuel gas supply apparatus according to claim 2, wherein the first pressure and the second pressure are pressures at positions before and after the differential pressure control valve.

4. The fuel gas supply apparatus according to claim 2, wherein the branch pipe is provided with an orifice, and
wherein the first pressure and the second pressure are pressures at positions before and after the orifice.

5. The fuel gas supply apparatus according to claim 2, wherein an auxiliary fuel gas supply pipe that supplies the fuel gas to the buffer tank is provided from the downstream side of the pressure adjustment valve in the main pipe, and
wherein the auxiliary fuel gas supply pipe is provided with a check valve that permits the flow of the fuel gas from the main pipe toward the buffer tank at a predetermined differential pressure or higher.

6. A fuel gas supply method for controlling a fuel gas supply apparatus including:

a main pipe that guides fuel gas whose pressure is increased by a pressurizer to a gas fired diesel engine;

pressure measurement device provided in the main pipe and configured to measure pressure of the fuel gas as a measured pressure; and a pressure adjustment valve provided on an upstream side of the pressure measurement device in the main pipe and configured to adjust the pressure of the fuel gas;

a differential pressure measurement device configured to measure a differential pressure before and after the pressure adjustment valve as a measured differential pressure;

a branch pipe that branches from the main pipe at an upstream position with respect to the pressure adjustment valve;

a buffer tank that is connected with the branch pipe and absorbs a variable pressure of the fuel gas in the main pipe caused by the pressurizer;

a first control unit configured to calculate a set pressure according to a load of the gas fired diesel engine and to control an opening degree of the pressure adjustment valve by using the calculated set pressure; and in a second control unit:

receiving information showing a predetermined relationship between a set differential pressure and the measured pressure measured by the pressure measurement device or the set pressure calculated by the first control unit, the predetermined relationship being that an increase and decrease of the set differential pressure is inversely proportional to an increase and decrease of the measured pressure or an increase and decrease of the set pressure;

determining the set differential pressure corresponding to the measured pressure or the set pressure by using the information; and controlling the pressurizer so that the measured differential pressure measured by the differential pressure measurement device matches the set differential pressure determined by using the information, wherein the information is used by the second control unit to reduce a pressure response time for adjusting pressure conditions of the fuel gas on downstream side of the pressure adjustment valve based on the change of the load of the gas fired diesel engine, a differential pressure control valve is provided on an upstream side of the buffer tank of the branch pipe, an opening degree of the differential pressure control valve is controlled to be a maximum value when a differential pressure between a first pressure at a position of the branch pipe on a side of the main pipe and a second pressure at a position closer to a buffer tank side than the position on the side of the main pipe is zero, and is controlled to decrease in opening degree from the maximum value as the differential pressure increases, and the opening degree of the differential pressure control valve is controlled to a minimum value when the differential pressure increases to a maximum value, the minimum value of the opening degree being less than the maximum value but greater than zero so as to maintain a predetermined opening degree.

7. The fuel gas supply apparatus according to claim 2, wherein an auxiliary fuel gas supply pipe that supplies the fuel gas to the buffer tank is provided from the downstream side of the pressure adjustment valve in the main pipe, and
wherein the auxiliary fuel gas supply pipe is provided with a check valve that permits the flow of the fuel gas from the main pipe toward the buffer tank at a predetermined differential pressure or higher.

8. The fuel gas supply apparatus according to claim 3, wherein an auxiliary fuel gas supply pipe that supplies the fuel gas to the buffer tank is provided from the downstream side of the pressure adjustment valve in the main pipe, and wherein the auxiliary fuel gas supply pipe is provided with a check valve that permits the flow of the fuel gas from the main pipe toward the buffer tank at a predetermined differential pressure or higher.

9. The fuel gas supply apparatus according to claim 4, wherein an auxiliary fuel gas supply pipe that supplies the fuel gas to the buffer tank is provided from the downstream side of the pressure adjustment valve in the main pipe, and wherein the auxiliary fuel gas supply pipe is provided with a check valve that permits the flow of the fuel gas from the main pipe toward the buffer tank at a predetermined differential pressure or higher.

* * * * *